US010212883B2

(12) United States Patent
Quincke (10) Patent No.: US 10,212,883 B2
(45) Date of Patent: Feb. 26, 2019

(54) HARVESTER HAVING A MEASURING DEVICE FOR GRAIN NUMBER DETECTION (71) Applicant: CLAAS Selbstfahrende Erntemaschinen GmbH, Harswinkel (DE)

(72) Inventor: Gunnar Quincke, Soest (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 51 days.

(21) Appl. No.: 15/461,095

(22) Filed: Mar. 16, 2017

(65) Prior Publication Data
US 2017/0273240 A1 Sep. 28, 2017

(30) Foreign Application Priority Data
Mar. 23, 2016 (DE) .................. 10 2016 105 488

(51) Int. Cl.
*A01D 41/127* (2006.01)
*A01F 12/44* (2006.01)
*G01H 17/00* (2006.01)

(52) U.S. Cl.
CPC ........ *A01D 41/1272* (2013.01); *A01F 12/446* (2013.01); *G01H 17/00* (2013.01)

(58) Field of Classification Search
CPC .............. A01D 41/127; A01D 41/1271; A01D 41/1273; A01D 41/1272; A01F 12/44; A01F 12/446; G01H 17/00
USPC ................................... 460/97, 100
See application file for complete search history.

(56) References Cited

U.S. PATENT DOCUMENTS

| 4,004,289 A | 1/1977 | Kirk |
| 4,651,331 A | 3/1987 | Harrsen et al. |
| 4,902,264 A * | 2/1990 | Diekhans ........... A01D 41/1273 460/5 |
| 7,415,365 B2 | 8/2008 | Jeppe |
| 9,629,308 B2 * | 4/2017 | Scholer .................. G01F 1/662 |
| 2007/0062288 A1 * | 3/2007 | Behnke .............. A01D 41/1273 73/587 |
| 2007/0233416 A1 | 10/2007 | Jeppe |
| 2014/0135082 A1 * | 5/2014 | Batcheller .......... A01D 41/1273 460/5 |

(Continued)

FOREIGN PATENT DOCUMENTS

| DE | 102006015152 A1 | 9/2008 |
| EP | 0166137 B1 | 1/1991 |
| EP | 0883983 A1 * | 12/1998 ......... A01D 41/1273 |

OTHER PUBLICATIONS

European search report for European Application No. 16 20 2682.

*Primary Examiner* — Robert E Pezzuto
(74) *Attorney, Agent, or Firm* — Lempia Summerfield Katz LLC (57) ABSTRACT A harvester includes a measuring device for detecting a grain number of a crop flow, in which a sensor of the measuring device detects via a measuring signal kernels impacting an impact surface of the measuring device, and a processing unit of the measuring device is arranged to detect and calculate the grain number by using the measuring signal, wherein the rising edges of the measuring signal are recorded and form a measurement for the grain number. Furthermore, the measuring device for detecting a grain number and method for detecting a grain number are also provided.

21 Claims, 3 Drawing Sheets (56) References Cited

U.S. PATENT DOCUMENTS

2016/0003656 A1    1/2016  Gelinske et al.
2017/0235471 A1*  8/2017  Scholer ............... G06F 3/04847
                                                    715/772

* cited by examiner

HARVESTER HAVING A MEASURING DEVICE FOR GRAIN NUMBER DETECTION

CROSS REFERENCE TO RELATED APPLICATIONS

This application claims priority to German Patent Application No. DE 102016105488.7, filed Mar. 23, 2016, the entire disclosure of which is hereby incorporated herein by reference.

TECHNICAL FIELD

A harvester is disclosed as including a measuring device having a sensor for detecting kernels impacting a surface of the measuring device via a measuring signal, and a processing unit arranged to detect the grain number by means of the measuring signal. A method for detecting a grain number of the crop flow is also disclosed, along with the measuring device.

BACKGROUND

To increase the efficiency when harvesting with a combine harvester, the working bodies of the threshing unit, the separation unit or the cleaning unit are today increasingly controlled automatically via performance curves and/or measuring signals. To precisely adjust the process parameters and also determine the grain loss, an accurate determination of the grain output of different mechanical functional units and working bodies is extremely important. At the same time, the grain output and grain loss can be determined by means of grain output sensors in the form of structure-borne sound sensors, light barrier sensors or capacitive sensors. Structure-borne sound sensors have the advantage of being cost-effective and robust. Their operating principle is based on determining the impact energy of a kernel impacting the impact surface. This results in mechanical vibrations, which are converted to an electrical measuring signal by means of a sound converter/piezo element. The measuring signal may be evaluated in different ways in order to obtain information regarding the volume of kernels impacting the surface.

For example, the publication DE 10 2006 015 152 A1 discloses a method for grain volume determination, in which the partial surface arranged below an amplitude of a measuring signal is used as measurement for the number of kernels impacting a structure-borne sound sensor. However, the vibration amplitude depends on the grain moisture and the speed of the kernel and therefore on the temperature and moisture of the surrounding area, as well as on machine parameters. Therefore, with this method, kernels with different vibration amplitudes are evaluated differently when the grain number is detected. This results in inaccurate measurement, which are affected by environmental conditions and machine parameters.

The publication EP 0 166 137 A2 describes a method for acoustically counting particles, in which a vibration amplitude of a measuring signal measured at a structure-borne sound sensor is compared with a characteristic reference signal. If the amplitude of the measured vibration signal is smaller than that of the reference signal, a particle is counted. If the amplitude is greater the impact of a following particle is assumed. Because of the required comparison between the measuring signal and the reference signal, this method is complex. Moreover, it became apparent that it may no longer fulfills the current requirements of accuracy.

SUMMARY

The present disclosure provides a method and a device for detecting a grain number, in particular a grain output and/or grain loss, in particular in a harvester, which is largely independent of environmental conditions and/or machine parameters, and with which it is possible to detect more precisely the grain number. A harvester configured with such a device is also disclosed.

In one aspect, a method for detecting a grain number of a crop flow is provided, in which a sensor of a measuring device detects via a measuring signal kernels that impact the impact surface of a sensor. A processing unit of the measuring device is arranged to detect the grain number via the measuring signal.

In one embodiment of the method, the rising edges of the measuring signal are detected and form a measurement for the grain number.

In one embodiment, the method is used in a harvester to detect grain output and/or grain loss. The harvester may be self-propelled. Initially, it is assumed that a kernel newly impacting the impact surface results in changing the rise of the measuring signal. On the one hand, this method does not require time-consuming and computationally intensive comparisons of the measuring signal and the reference signal. On the other hand, the vibration amplitude, i.e., the volume of the measuring signal is not included in the calculations. Therefore, the method allows the grain number to be detected independent of environmental conditions and machine parameters. It has been demonstrated that an examination of the rising edges allows for a considerably more accurate detection of the grain number when compared to prior art.

For this purpose, the measuring signal is preferably preprocessed. In the context of the preprocessing, the measuring signal is preferably straightened and reinforced. Furthermore, the measuring signal is preferably filtered to remove signal noise, which may be accomplished using low-pass filters and/or bandpass filters.

Furthermore, the preprocessed measuring signal may be rectified. In this way, it is subsequently possible to consider negative signal components and convert them to positive signal components. Subsequently, an envelope curve is formed by the rectified measuring signal. In principle, an envelope curve can also be formed only by the positive signal components. However, the rectification of the preprocessed measuring signal results in a more precise, especially a more distinct, envelope curve.

In one embodiment, the envelope curve is formed with customary electronic components. It can also be formed using a programmed processor or programmable electric components.

In one embodiment, the envelope curve of the measuring signal is digitized. However, it is also possible to digitize the measuring signal prior to the rectifying process or to digitize the rectified measuring signal. In an especially simple manner, the measuring signal or the envelope curve is digitized by means of an AD converter.

To detect the rising edges, the rise of the envelope curve is recorded. For this purpose, the envelope curve may be differentiated. The differentiation results in a pulse sequence with a plurality of impulses, the volume of which represents the rise of the envelope curve at the scanning time. A differentiation represents a particularly fast process.

As a result, the rising edges are represented as positive impulses of the differentiated envelope cure. Preferably, only positive impulses of the differentiated envelope curve form a measurement for the grain number. They may be quickly detected without time-consuming comparisons.

However, the measuring signal, and thus also the envelope curve, may be distorted by non-grain constituents of the crop flow, for example, stalks and chaff, impacting the impact surface, or by vibrations, repeated impacts of the same kernel and/or multiple kernels simultaneously impacting the impact surface. This may result in an incorrect detection of the grain number, which is compensated by using different selection criteria.

To exclude minor rises which are caused, for example, by machinery surrounding the measuring device, in particular, a harvester, and/or by stalks and chaff, only positive impulses of the differentiated envelope curve, which is arranged above a particular minimum threshold, are counted as grain.

By considering only positive impulses of the differentiated measuring signal, which are arranged above the minimum threshold, signals of non-grain constituents of the crop flow are filtered out and the noise is reduced. By using a noise squelch, in particular in the form of a comparator, the minimum threshold may be easily implemented.

Especially preferred, a time-dependent and/or amplitude-dependent limit function is determined for a current positive impulse of the differentiated envelope curve, which is arranged above the minimum threshold. The limit function precludes the same kernel from being detected multiple times, which, for example, could result from an impact or repeated impacts of the same kernel. Preferably, the limit function is a constantly declining function. It is especially preferred when the limit function involves a function that declines linearly. However, it can also involve a non-linearly declining limit function.

To correctly detect positive impulses, which range within a reference number of detected sample values, it is preferred to add impulses of the differentiated envelope curve, which range within a reference number of sample values, exceed the minimum threshold and are smaller than a value of the limit function, to a total value. Preferably, they are counted as grain when the total value is greater than the limit function value. Subsequently, the total value is treated like a positive impulse. Through the accumulation, the volume of this positive impulse is determined almost correctly.

It is especially preferred that only an impulse of the differentiated envelope curve, which follows the current positive impulse, is counted as grain when it has a value which is greater than the value of the limit function at the point of the following impulse. The limit function acts as a dynamic additional minimum threshold.

In one embodiment, an impulse of the differentiated envelope curve, which has a volume greater than the volume of the current positive impulse, and which follows the current positive impulse is only counted as subsequent current positive impulse when a minimum interval between the two impulses has passed. This has the advantage that a repeated impact of the same kernel does not result in an incorrect multiple determination.

In addition, each positive impulse of the differentiated envelope curve counted as grain forms the current positive impulse for which the limit function is newly calculated. Therefore, each positive impulse has a temporally limited effect on the identification of following impulses. At the same time, each current positive impulse is a starting point for its own limit function.

Because of the fact that a medium pulse duration increases with rising signal level, the grain number may be evaluated with a correction factor. Based on the evaluation, the grain number may be adjusted to the signal level. As a result, it is possible to perform a crop type dependent and/or drop height dependent correction of the detected grain number.

Alternatively, the method may also be applied in that the positive signal components of the measuring signal are converted to negative signal components. Additionally or alternatively, the method can also be adjusted in such a way that the fall edges are used instead of the rising edges and/or negative impulses instead of positive impulses.

Therefore, the grain number is detected by adding the number of distinctive positive impulses of the pulse sequence. If required, a correction is performed based on the signal level. It has been demonstrated that it is possible in this way to detect the grain number very precisely. Detecting the grain number in a harvester, preferably a self-propelled combine harvester, allows for optimizing the adjustment of the working bodies of the harvester. As a result, it is possible to increase the crop output, reduce the grain breakage proportion and/or reduce grain losses.

In harvesters, in particular in self-propelled harvesters, the grain number detected as grain output and/or the grain number detected as grain loss can be used to control the working bodies of the harvester.

In one embodiment, the measuring device includes the sensor and a processing unit. Preferably, the sensor comprises an electroacoustic sensor, especially preferred a structure-borne sound sensor. In this embodiment, it has an impact surface, wherein a vibration of the impact surface resulting from the impact of a kernel is detected as measuring signal. The processing unit is provided for determining the grain number using the detected measuring signal of the sensor. For this purpose, it is preferred that it comprises an electronic circuit, a programmable module and/or a processor.

In one embodiment, the measuring device is arranged in flow direction of a crop flow on the rear end of the harvester. Preferably, the measuring device, or at least the sensor of the measuring device, is provided on the rear end of a cleaning unit.

Preferably, the harvester comprises a control system, which is arranged to control the working bodies for processing the crop flow depending on the detected grain number. It is especially preferred that the control system is used in the processing unit of the measuring device for detecting the grain number.

BRIEF DESCRIPTION OF THE DRAWINGS

The figures merely represent examples and do not restrict the general idea of the invention. It is shown:

FIG. 3 in (a) a preprocessed measuring signal, in (b) a digitized differentiated measuring signal and in (c) a selection of the positive impulses evaluated as grain.

DETAILED DESCRIPTION

Figure 1:
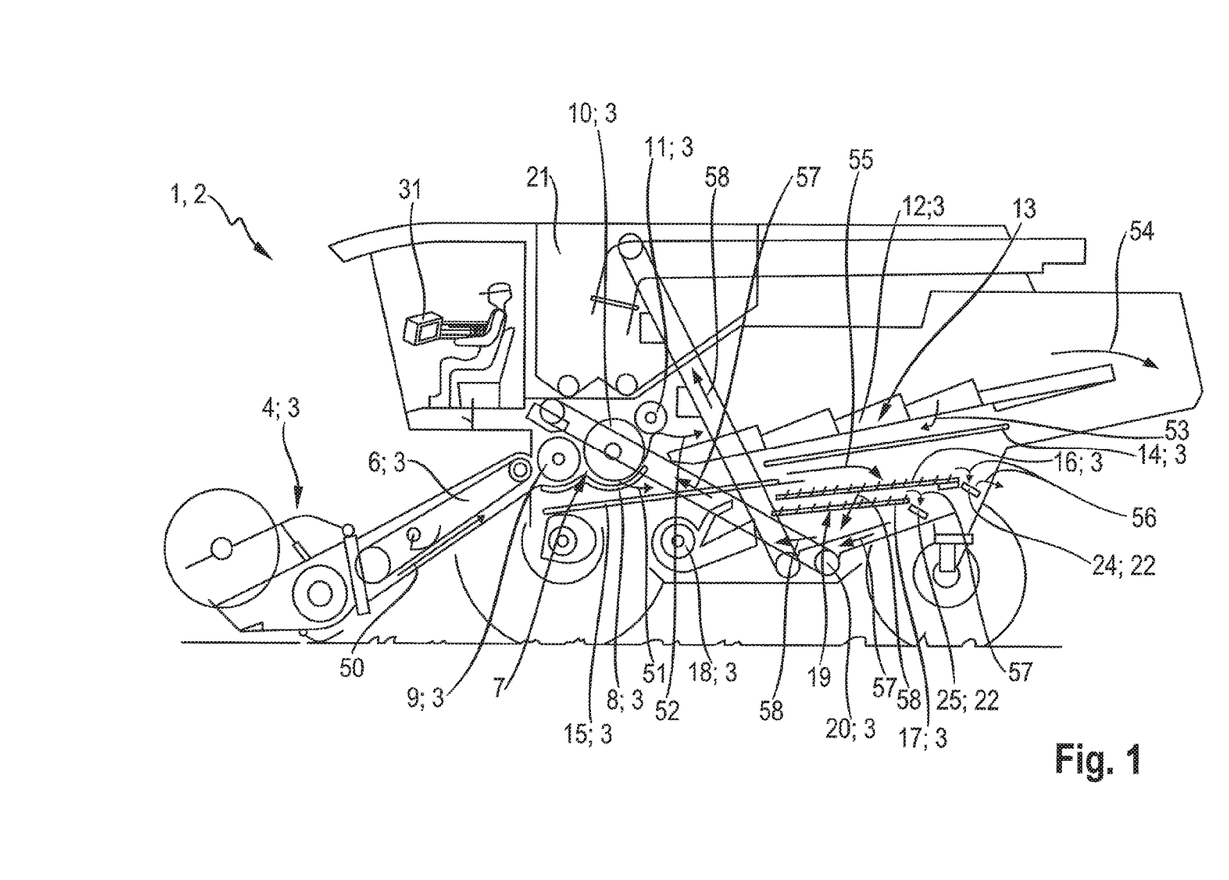
FIG. 1 a self-propelled harvester with a measuring device for detecting a grain number.

FIG. 1 shows a diagram of a self-propelled harvester 2 designed in the form of a combine harvester. The combine harvester 1 comprises a plurality of working bodies 3 for conveying and/or processing the crop.

The crop is received by an attachment 4 and conducted in a supplied crop flow 50 to the threshing unit 7 via an inclined conveyor 6. The threshing unit 7 comprises a threshing concave 8, an acceleration drum 9, a threshing drum 10 and a deflection drum 11. At the threshing concave 8, a first separation of freely moving kernels in the form of a first crop flow 51 takes place.

After passing the threshing unit 7, a second crop flow 52, which comes from the threshing unit and contains stalk sections and non-threshed grain, is supplied to a separation unit 13 designed in the form of a shaker 12. Via the shaker 12, the freely moving kernels still contained in the second crop flow 52 are separated in the form of a third crop flow 53 to a return floor 14 and a preparation floor 15. The remaining fourth crop flow 54, primarily consisting of stalk sections, is transported out of the harvester 2.

Other embodiments of the combine harvester 1 may be configured with other types of separation units, such as an axial separator or other separation unit 13.

Via the return floor 14 and the preparation floor 15, the first and third crop flow 51, 53 coming from the threshing concave 8 and from the shaker 12 are combined to a fifth crop flow 55 and supplied to a cleaning unit 19 having multiple screening levels 16, 17 and a blower 18. Here, the kernels of the fifth crop flow 55 are cleaned and non-grain constituents, for example, stalk sections and chaff, are separated in the form of a sixth crop flow 56 and transported out of the harvester 2.

Moreover, the combine harvester 1 shown includes a return auger 20, such that a seventh crop flow 57, which was not completely threshed, can be supplied again to the threshing unit 7.

A cleaned eighth crop flow 58 consisting of kernels is supplied to the grain tank 21.

On a rear end of the cleaning unit 19 in flow direction, especially the screening levels 16, 17 of the cleaning unit 19, the combine harvester 1 shown includes measuring devices 22. Each of the measuring devices 22 has sensors 23, which are configured in one embodiment in the form of structure-borne sound sensors 24, 25. The structure-borne sound sensors 24, 25 are provided for detecting a grain number 26. Because of the fact that the measuring device 22 is positioned at the rear end of the cleaning unit 19, on the one hand, a grain loss of the harvester 1 is detected and, on the other hand, a grain proportion is detected in the seventh crop flow 57, which can be supplied again to the threshing unit 7.

The structure-borne sound sensors 24, 25 include an impact surface, which are set in vibration by impacting particles. The impact surface of the structure-borne sound sensors 24, 25 can be designed from one or multiple planar, bar-shaped or different surfaces. A sound converter is connected to the impact surface, which sound converter detects the vibrations in the form of an electrical measuring signal 27.

In various embodiments, the structure-borne sound sensors 24, 25 may be placed in different crop flows 50-58 on/at the harvester 2, for example, at the rear end of the separation unit 13 for measuring grain loss. The crop flows 50-58 shown are not to be understood as final, or limiting, but rather depend on the technical configuration of the harvester 2.

Figure 2:
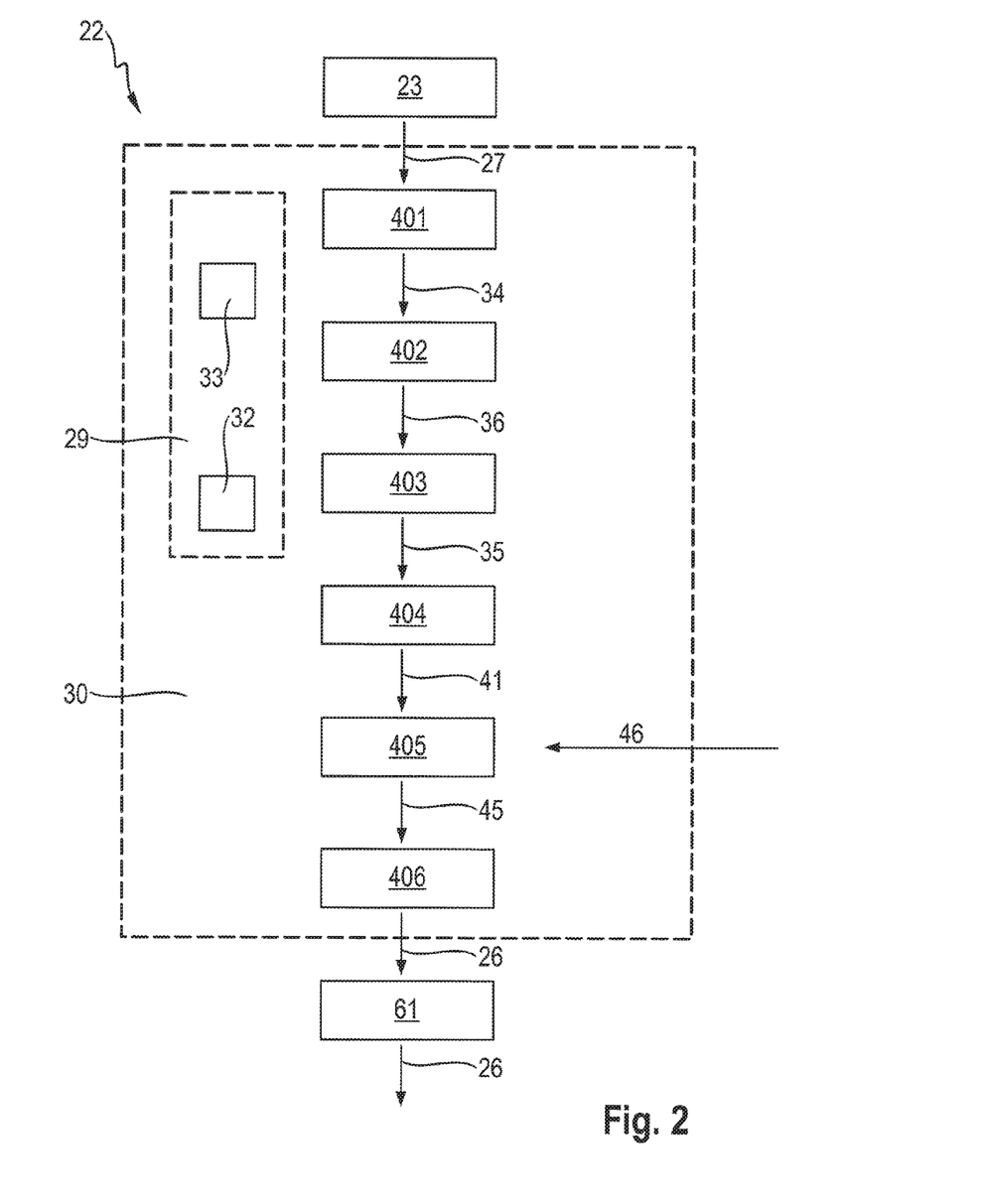
FIG. 2 a diagram of a measuring device for detecting the grain number.

FIG. 2 shows a schematic description of a method for determining the number of kernels 26, which impact the impact surface, by way of the measuring signal 27.

FIG. 2 shows a diagram of the measuring device 22 for detecting the grain number 26. The measuring device 22 includes the sensor 23 and a processing unit 30, which is arranged to detect the grain number via the measuring signal 27.

For this purpose, the processing unit 30 uses a control system 29 of the measuring device 22 (see FIG. 2), which comprises a processor, electronic circuits 33 and/or other, especially programmable, electric components. Here, the control system 29 is provided as a separate control system 29 of the measuring device 22. However, it is also possible to use the control system 31 of the harvester 2. In principle, it is possible to provide electronic circuits and/or programmable electronic components instead of a control system 29, 31.

For processing the measuring signal 27, the processing unit 30 includes means for preprocessing 401 the measuring signal 27. In the process, the measuring signal 27 is amplified by means of a customary amplifier, straightened by means of customary filters and/or freed of noises.

Furthermore, the processing unit 30 comprises a rectifier; for example, a comparator to rectify the preprocessed measuring signal 34. Subsequently, the rectified measuring signal is digitized with an AD converter (analog-to-digital converter). Here the rectification and digitization are depicted with the reference numeral 402.

Furthermore, the processing unit 30 includes means for forming the envelope curve 35 of the preprocessed, rectified, digitized measuring signal 36. Preferably, the means for forming the envelope cure 35 are produced from electronic components. However, program-based processing by means of programmed components or the processor 32 can also be used for forming the envelope curve 35.

Here the rising edges 37 of the envelope curve 35 are detected to determine the grain number 26. Their number forms a measurement for the grain number 26. For this purpose, initially the rise of the envelope curve 35 is determined. At the same time, the processing unit 30 includes means for differentiating 404 the envelope curve 35. The differentiation 404 of the envelope curve 35 results in a pulse sequence 41, which has a plurality of impulses 42. The volume of an impulse 49 respectively represents the rise of the envelope curve 35 at the scanning time 43. At the same time, the rising edges 37 are formed by positive impulses 44.

To exclude vibrations of the harvester 2 and/or signal components of a differentiated envelope curve 41, which are caused by stalks and/or chaff, the processing unit 30 also includes means for selecting relevant positive impulses 44 and/or means for evaluating the preliminary grain number 45. The means can also be formed by electronic components or can be implemented based on a program.

For presetting the processing unit 30, it comprises a user interface and/or a memory for entering and/or storing process-relevant selection criteria and/or calibration values 46, which are especially relevant for detecting the preliminary grain number 45. Thereby, selection criteria for choosing the positive impulses counted as grain, for example, a minimum threshold 47, a minimum interval 48 and/or a rise of a limit function 60 are adjusted.

Finally, the processing unit 30 includes means for evaluating the preliminary grain number 45. The means can also be formed from electronic components or implemented based on a program. During the evaluation process, the grain number 26 is generated from the preliminary grain number 45 by means of a correction factor.

Furthermore, the processing unit 30 includes a communication interface 61. Via the communication interface 61, the processing unit 30 is connected with a control system 31 of the harvester 2. By means of the detected grain number 26, it is thus possible to regulate the harvesting process, in particular the working bodies 3 of the harvester 2. In the present embodiment, the grain number 26 is transmitted to the control system 31 of the harvester 2 by means of a communication interface 61 designed in the form of a CAN bus (control area network). Generally, the data transfer can be performed wireless or in wire-connected fashion. Alternatively or additionally, it is possible to provide other communication interfaces 61, which are suitable for data transfer, for example, ISO bus, LIN bus (local interconnect network), PWM (pulse-width-modulated communication interface), Bluetooth, radio communication, IR (infrared), Ethernet and others.

From the grain number 26, the control system 31 of the harvester 2 calculates, automatically, the grain output of the respective working bodies 3, as well as grain losses and controls the working bodies 3 and/or the forward speed of the combine harvester 1. At the same time, the control system is adjusted online, i.e., during the harvesting process, to the grain number 26, the grain output and/or grain losses. The control system can be based on a predefined harvesting strategy, parameter adjustments and/or data of other measuring devices 22. Alternatively or supplementary, the grain number 26, the grain output and/or grain losses can be displayed for the operator of the harvester 2, so that the operator can adjust the control system and/or control the working bodies 3 manually.

Figure 3:
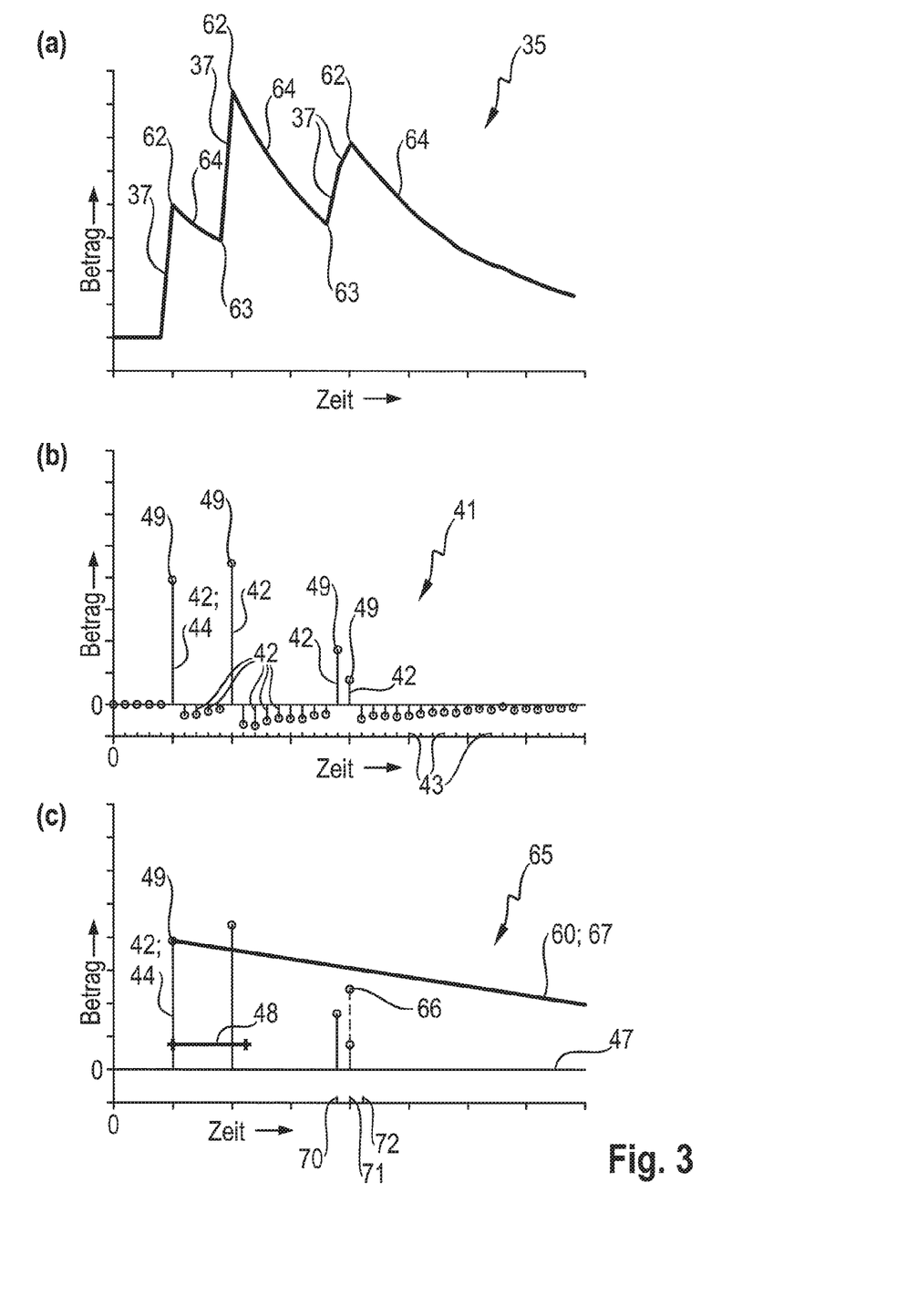

Details for processing the measuring signal 27 and for selecting the relevant positive impulses 44 are shown in FIGS. 3(*a*)-3(*c*).

FIG. 3(*a*) shows an envelope curve 35 of a preprocessed, rectified measuring signal. The envelope curve includes multiple local signal maxima 62 and local signal minima 63, as well as turning points. The envelope curve 35 has rising edges 37 and fall edges 64 between the local signal maxima 62 and the local signal minima 63.

The rising edges 37 are detected to determine the grain number 2. For this purpose, the envelope curve 35 is digitized and differentiated. The differentiated envelope curve 41 is shown in FIG. 3(*b*). In the differentiated envelope curve 41, the rising edges 37 of the envelope curve 41 are represented as positive impulses 44. The volume of the impulses 49 corresponds to the rise of the envelope curve 35 at the scanning time 43. Therefore, the differentiated envelope curve 41 is a pulse sequence 41 with a plurality of impulses 42. Subsequently, the differentiated envelope curve 41 is also depicted as pulse sequence 41.

The method is based on the assumption that a new kernel impacting the impact surface results in a great rising edge 37. Therefore, according to this method, only positive impulses 44 are detected when determining the grain number.

Subsequently, other selection criteria is considered in the detection of the grain number. Initially, impulses 42, which fall below a minimum threshold 47, are not recorded. As a result, signal components of non-grain constituents of the crop flows 56, 47, as well as noise components, are filtered out. FIG. 3(*c*) shows the filtered pulse sequence 41.

For a current positive impulse 44 of the filtered pulse sequence 65, which is arranged above the minimum threshold 47, a time-dependent and/or amplitude-dependent limit function 60 is determined. Here the limit function 60 is a falling linear function. The determination of the limit function 60 is based on empirically determined initialization values.

By means of the limit function 60, it is possible to prevent a multiple determination of the same kernel, which results from a repeated impact of the same kernel.

If local signal maxima 62 are arranged between the sample values 70-72, the volume 49 of the detected impulse 42 can range below the volume 49 of the current positive impulse 44 that is assigned to the rising edge. Therefore, impulses 42 of the filtered pulse sequence 65, which range within a reference number of the sample values 70-72, and which exceed the minimum threshold 47, are added to a total value 66, if they are smaller than a value of the limit function 60 at the scanning time. At the same time, the total value 66 is assigned to the most recent of the added impulses 42. The total value is treated like a positive impulse 44. Therefore, it is counted as grain when it is greater than the limit function value.

Furthermore, an impulse 42 of the filtered pulse sequence 65 following the current positive impulse 44, which has a value 49 that is greater than the value 49 of the current positive impulse 44, is counted only as the next current positive impulse 44 and added to the detected preliminary grain number 45, when a minimum interval 48 has passed between the two impulses. Therefore, a multiple impact of a kernel does not result in a multiple determination of the same kernel.

Furthermore, each positive impulse 44 of the filtered pulse sequence 65 counted as grain forms the current positive impulse 44, for which the limit function 60 is newly calculated. Therefore, such a positive impulse 44 has a temporally limited effect on the identification of following positive impulses 44. Therefore, the limit function 60 forms here a dynamic additional minimum threshold 67.

The positive impulses 44 counted as grain are added to the preliminary grain number 45. Subsequently, a crop type dependent and/or drop height dependent correction of the value thus determined is performed by evaluating the preliminary grain number 45 by means of a correction factor. The result is the grain number 26. The correction factor used for evaluation comprises the determination of the averaged signal level of all counted positive impulses 44. Alternatively or additionally, it is also possible to use different evaluations.

Therefore, the process-relevant selection criteria includes the minimum threshold 47, the minimum interval 48, the limit function 60 and/or the reference number of the sample values 70-72.

The method detects the grain number 26 by adding the number of distinctive rising edges 64 of the measuring signal 27, in particular the envelope curve 35 of the preprocessed rectified measuring signal 27.

It can be implemented with high speed in a cost-effective manner. The number of required calibration is considerably reduced. The method allows for an extremely precise detection of the grain number 26.

REFERENCE LIST

1 combine harvester
2 harvester
3 working body
4 attachment
50 supplied crop flow
51 first crop flow
52 second crop flow 53 third crop flow
54 fourth crop flow
55 fifth crop flow
56 sixth crop flow
57 seventh crop flow
58 eighth crop flow
6 inclined conveyor
7 threshing unit
8 threshing concave
9 acceleration drum
10 threshing drum
11 deflection drum
12 shaker
13 separation unit
14 return floor
15 preparation floor
16 screening level
17 screening level
18 blower
19 cleaning unit
20 returns auger
21 grain tank
22 measuring device
23 sensor
24 structure-borne sound sensor
25 structure-borne sound sensor
26 grain number
27 measuring signal
29 control system of the measuring device
30 processing unit
31 control system of the harvester
32 processor
33 electronic circuit
34 preprocessed measuring signal
35 envelope curve
36 preprocessed rectified digitized measuring signal
37 rising edge
401 preprocessing
402 rectification and digitization
403 forming the envelope curve
404 differentiation
405 selection of relevant positive impulses
406 evaluation of the preliminary grain number
41 pulse sequence; differentiated envelope curve
42 impulse
43 scanning time
44 positive impulse
45 preliminary grain number
46 calibration values
47 minimum threshold
48 minimum interval
49 volume of an impulse
60 limit function
61 communication interface
62 local signal maximum
63 local signal minimum
64 fall edge
65 filtered pulse sequence
66 total value
67 dynamic minimum threshold
70 first sample value
71 second sample value
72 third sample value

The invention claimed is:
1. A harvester comprising:
a measuring device comprising:
a sensor comprising an impact surface and a sound converter configured to produce a measuring signal associated with kernels impacting on the impact surface; and
a processing unit configured to:
process the measuring signal,
detect rising edges of the processed measuring signal without comparing the processed measuring signal with a reference signal, and
provide a grain number measurement based on the detected rising edges.

2. The harvester of claim 1 further comprising a working body and a control system configured to control the working body in response to the grain number measurement received from the processing unit.

3. The harvester of claim 1 wherein the processing unit is configured to preprocess the measuring signal by filtering the measuring signal.

4. The harvester of claim 1 wherein the processing unit is further configured to form an envelope curve for the preprocessed measuring signal; and
wherein the processing unit is configured to detect the rising edges of the processed measuring signal using a means for differentiating the envelope curve.

5. The harvester of claim 4 wherein the means for differentiating the envelope curve results in a pulse sequence with a plurality of impulses, with a volume of a respective impulse indicative of a rise of the envelope curve.

6. The harvester of claim 5 wherein the processing unit is further configured to only consider impulses from the plurality of impulses greater than a minimum threshold as being indicative of the kernels impacting on the impact surface.

7. The harvester of claim 4 wherein the processing unit is further configured to use a limit function in order to determine whether to limit use of an impulse as indicative of the kernel impacting on the impact surface.

8. The harvester of claim 7 wherein the processing unit is configured to analyze, using the limit function, a first impulse and a second impulse in combination to determine whether the second impulse is indicative of a multiple impact of the kernel.

9. The harvester of claim 8 wherein the processing unit is configured to add a volume of the first impulse with a volume of the second impulse to generate an added impulse value; and
wherein the processing unit is configured to compare the added impulse value with the limit function to determine whether the second impulse is indicative of the multiple impact of the kernel.

10. The harvester of claim 9 wherein the processing unit is configured to determine that the second impulse is not indicative of the multiple impact of the kernel responsive to determining that the added impulse value is greater than the limit function.

11. The harvester of claim 7 wherein the limit function comprises a time-dependent function.

12. The harvester of claim 7 wherein the limit function comprises an amplitude-dependent function.

13. The harvester of claim 7 wherein the limit function comprises a dynamic minimum threshold.

14. The harvester of claim 7 wherein impulses of the envelope curve, which range within a reference number of sample values, exceed a minimum threshold and are smaller than a value of the limit function, are added to a total value and counted as grain, when the total value is greater than the limit of the function value; and wherein only an impulse of the envelope curve following a current positive impulse is counted as grain when the impulse has a volume which is greater than the value of the limit function at a point of a following impulse.

15. The harvester of claim 14 wherein an impulse of a differentiated envelope curve, which has a volume greater than the volume of the current positive impulse, is only counted as a subsequent current positive impulse when a minimum interval between two impulses has passed; and wherein each positive impulse of the envelope curve counted as grain forms the current positive impulse for which the limit function is newly calculated.

16. The harvester of claim 1 wherein the processing unit is configured to preprocess the measuring signal by straightening or reinforcing the measuring signal.

17. The harvester of claim 1 wherein the processing unit is configured to rectify and digitize the preprocessed measuring signal and form an envelope curve for the preprocessed measuring signal; and wherein the processing unit is configured to detect the rising edges in the envelope curve.

18. A harvester comprising:
a measuring device comprising:
a sensor comprising an impact surface and a sound converter configured to produce a measuring signal associated with kernels impacting on the impact surface; and
a processing unit configured to:
process the measuring signal,
detect a first rising edge of the processed measuring signal,
detect a second rising edge of the processed measuring signal,
analyze, using a limit function, both the detected first rising edge and the detected second rising edge to determine whether the detected second rising edge is indicative of a multiple impact of the kernel,
responsive to determining that the detected second rising edge is not indicative of the multiple impact of the kernel, provide a grain number measurement based on the detected first rising edge and the detected second rising edge, and
responsive to determining that the detected second rising edge is indicative of the multiple impact of the kernel, provide a grain number measurement based on the detected first rising edge but not based on the detected second rising edge.

19. The harvester of claim 18 wherein the limit function comprises a time-dependent function.

20. The harvester of claim 18 wherein the limit function comprises a dynamic minimum threshold.

21. The harvester of claim 18 wherein the processing unit is configured to analyze both the detected first rising edge and the detected second rising edge to determine whether the detected second rising edge is indicative of a multiple impact of the kernel by:
adding an indication of the detected first rising edge with an indication of the detected second rising edge to generate an added value; and
comparing the added value with the limit function to determine whether the detected second rising edge is indicative of the multiple impact of the kernel.

* * * * *